(12) United States Patent
Noe

(10) Patent No.: US 6,694,920 B1
(45) Date of Patent: Feb. 24, 2004

(54) METHOD OF USING SOUND FOR ATTRACTING AND GRADING FISH

(76) Inventor: Wendell Harold Noe, 2823 Hwy. 69, Lake City, AR (US) 72437-8603

(*) Notice: Subject to any disclaimer, the term of this patent is extended or adjusted under 35 U.S.C. 154(b) by 0 days.

(21) Appl. No.: 10/391,087

(22) Filed: Mar. 18, 2003

Related U.S. Application Data

(63) Continuation-in-part of application No. 09/901,233, filed on Jul. 9, 2001, now Pat. No. 6,532,902.

(51) Int. Cl.⁷ .......................... A01K 15/02; A01K 61/02
(52) U.S. Cl. ..................... 119/712; 119/719; 119/51.04; 119/216; 119/230
(58) Field of Search ................................. 119/712, 718, 119/719, 721, 51.01, 51.04, 215, 216, 217, 230

(56) References Cited

U.S. PATENT DOCUMENTS

| | | | |
|---|---|---|---|
| 1,409,227 A | | 3/1922 | Maiwurm |
| 4,029,049 A | | 6/1977 | Hillier .............................. 119/3 |
| 4,351,269 A | * | 9/1982 | Rines et al. ................. 119/233 |
| 4,744,331 A | * | 5/1988 | Whiffin ........................ 119/223 |
| 5,351,653 A | * | 10/1994 | Marischen et al. .......... 119/719 |
| 5,448,968 A | * | 9/1995 | Ostlie ........................... 119/220 |
| 5,484,320 A | * | 1/1996 | Becker ......................... 446/418 |
| 5,560,615 A | | 10/1996 | Van Der Mude ............ 273/444 |
| 5,634,292 A | * | 6/1997 | Kitterman ..................... 43/115 |
| 5,983,553 A | * | 11/1999 | Gordon ........................ 43/17.6 |
| 6,192,617 B1 | * | 2/2001 | Lyles .......................... 43/42.06 |
| 6,347,908 B1 | | 2/2002 | Safwat .......................... 405/81 |
| 6,427,375 B1 | * | 8/2002 | Hair et al. .................... 43/17.1 |

OTHER PUBLICATIONS

Kozicky, Edward L., Hunting Preserves for Sport or Profit (1998), p. 79, Caesar Kleberg Wildlife Research Institute, Kingsville, Texas, USA.

* cited by examiner

*Primary Examiner*—Yvonne Abbott
(74) *Attorney, Agent, or Firm*—Walker, McKenzie & Walker, PC

(57) ABSTRACT

A duck shooting resort layout having a body of water, a peripheral embankment encircling the water, a duck hunting region within the resort, and duck hunting blinds within the hunting region from which hunters may shoot ducks. A method of training ducks to fly only within the hunting region is described. Multiple embodiments, with islands, piers, or embankment fingers, are described that safely allow a high density of hunters within a given land area. The resort terrain may be sculpted into the invention's structure at a minimum of cost and movement of dirt. The water depth may increase toward the channel ends for harvesting fish by partial draining, and grading screens may be provided at the ends for harvesting fish. A method of using sound for attracting and grading fish in a commercial fish farming operation, with grading screens used during harvesting of fish.

7 Claims, 8 Drawing Sheets

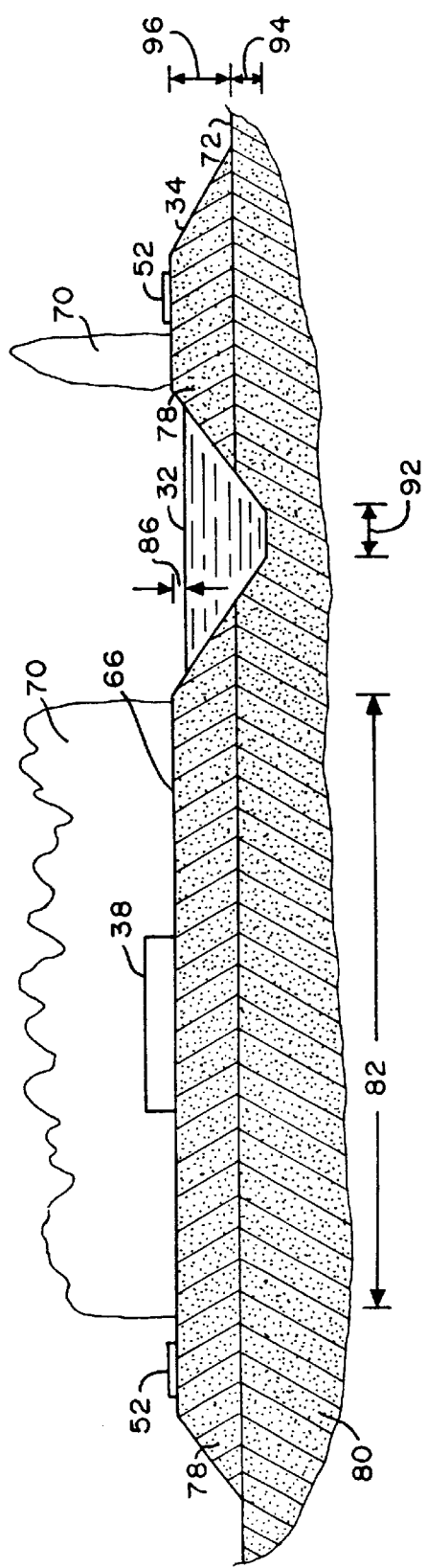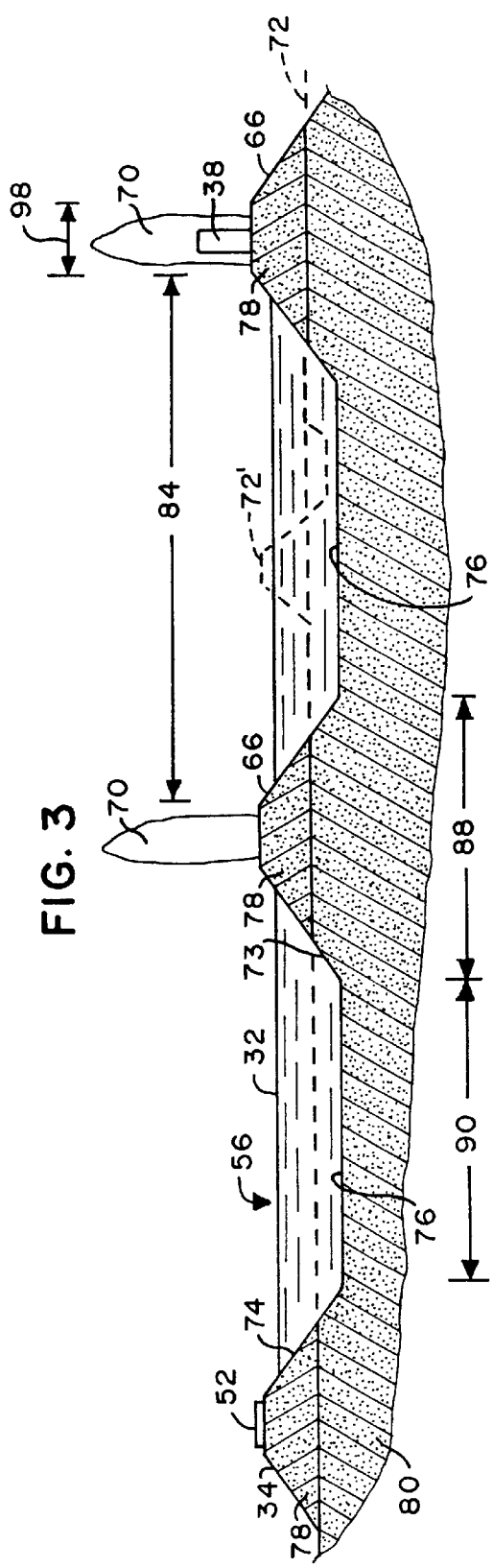

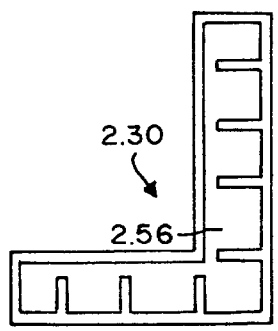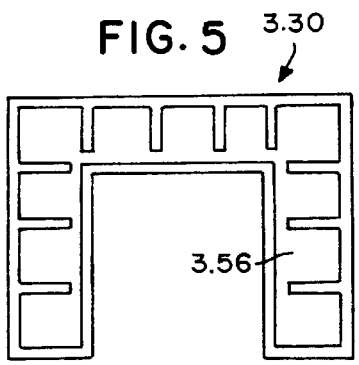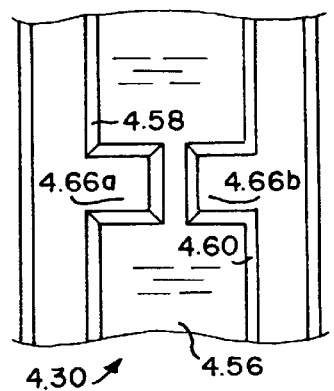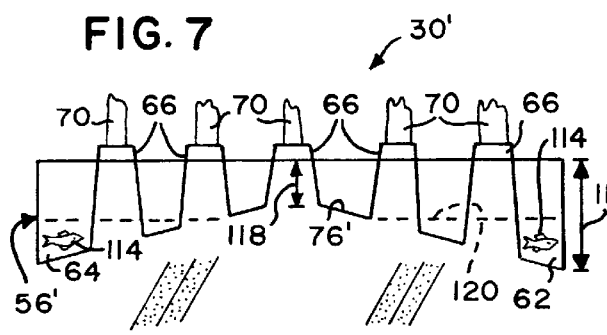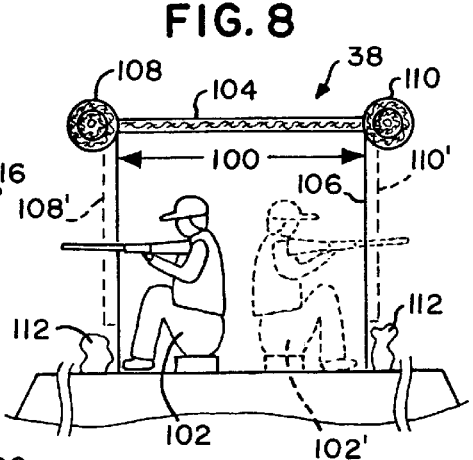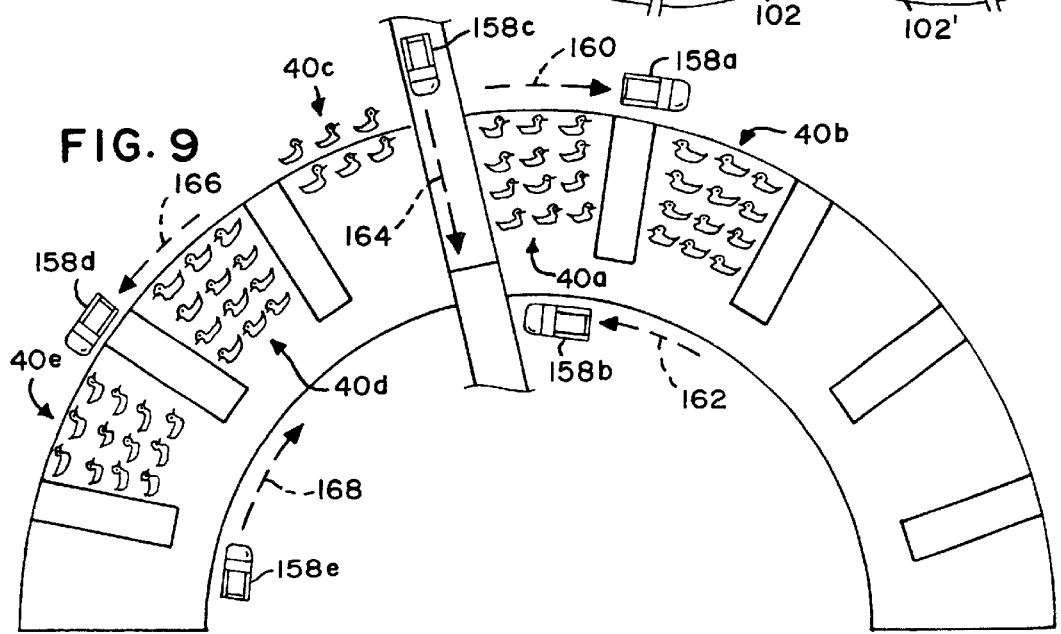

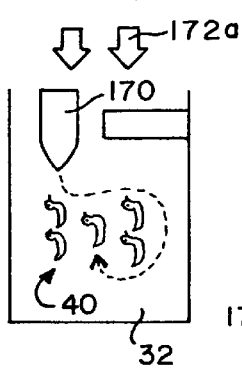
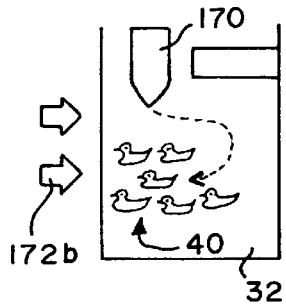
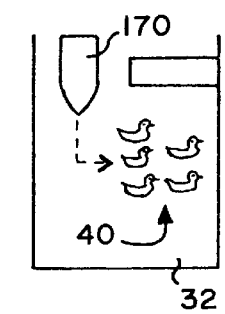
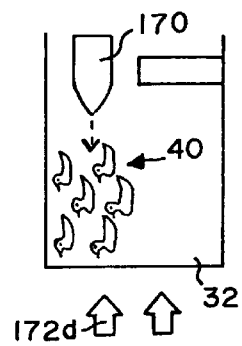
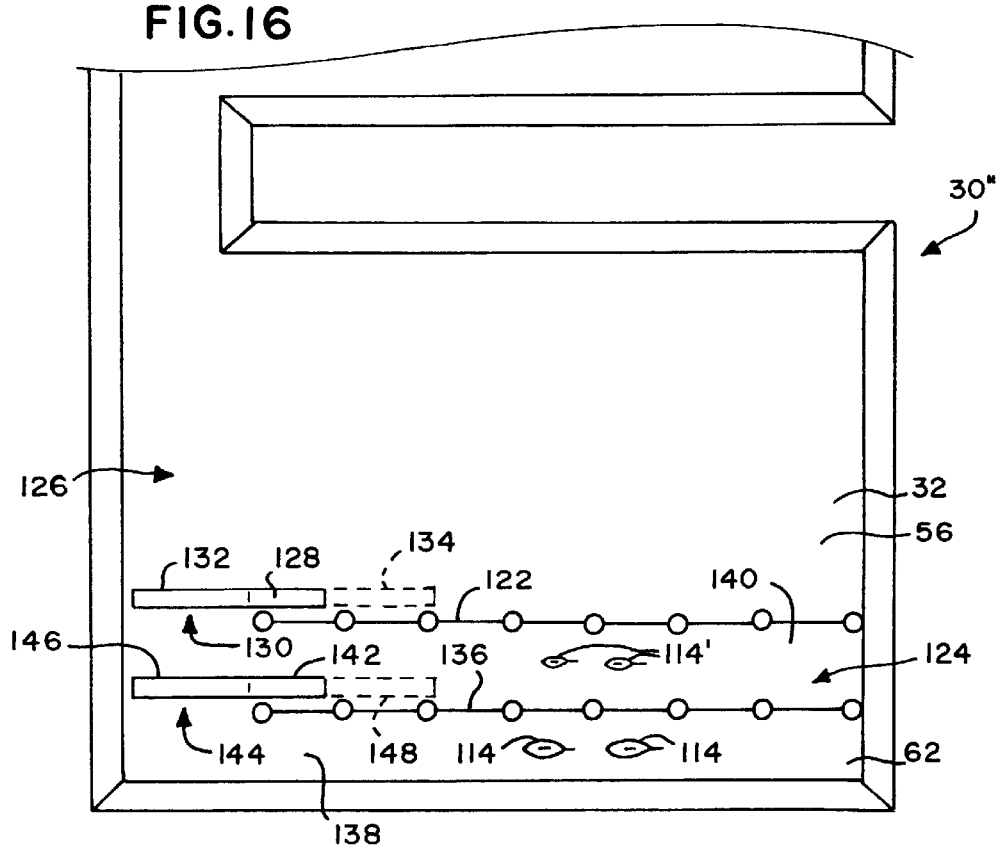
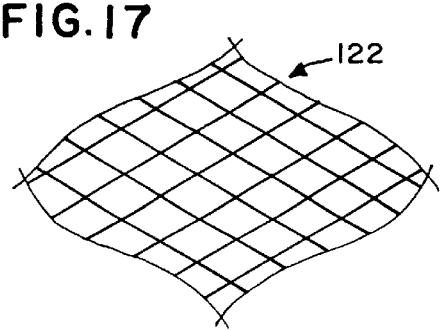
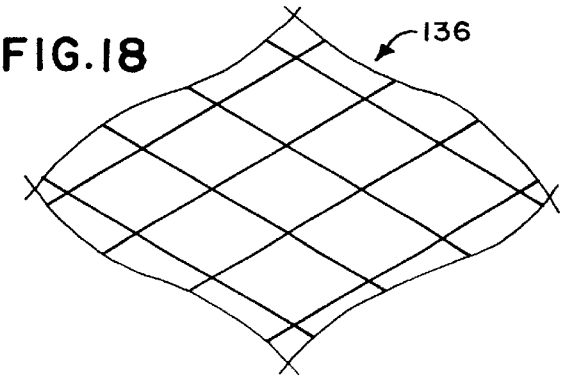

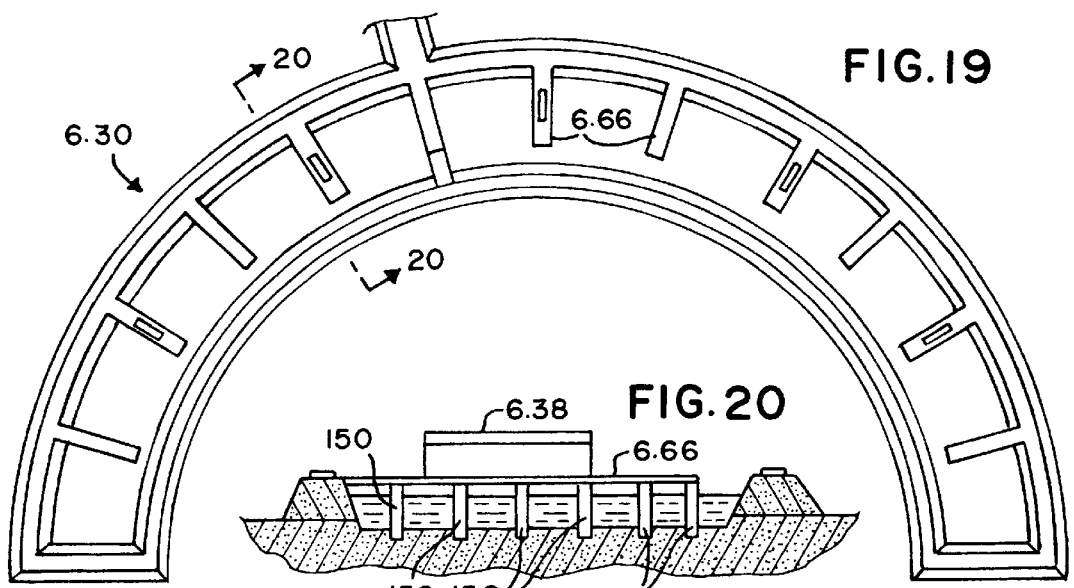
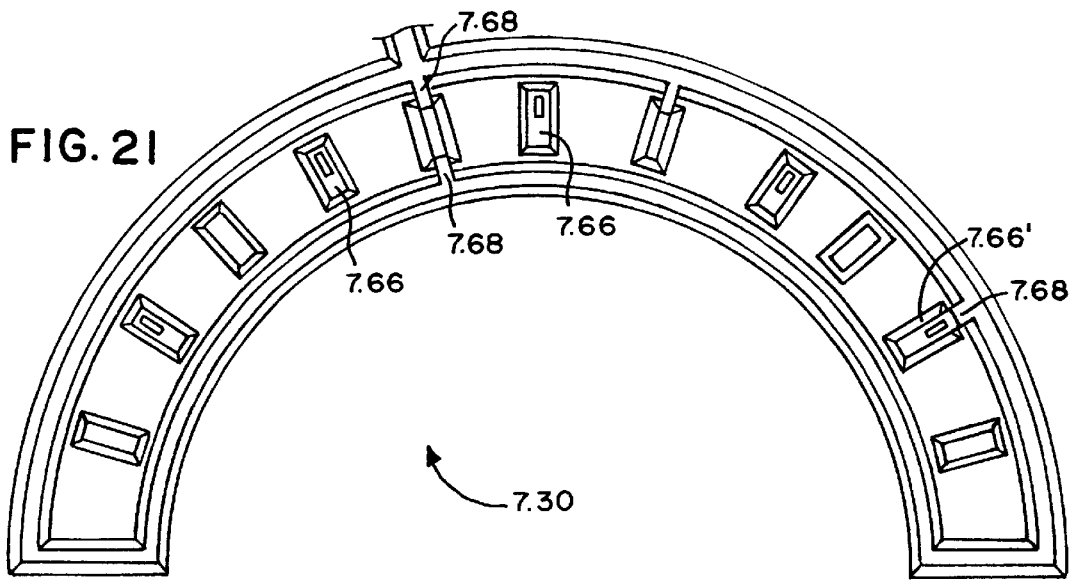
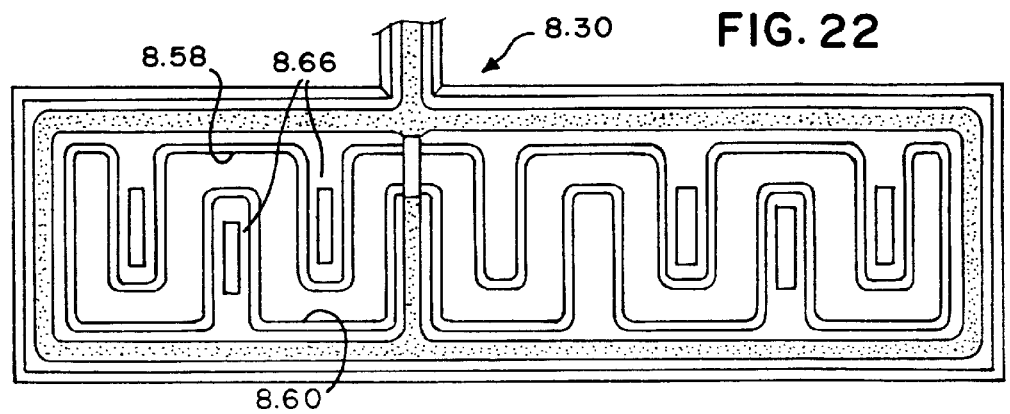

FIG. 23 (Prior Art)
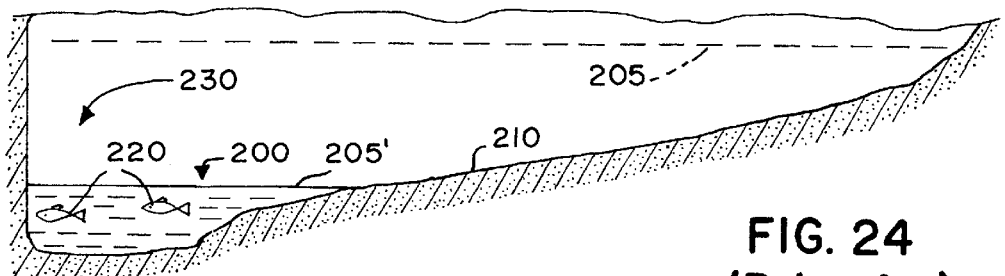
FIG. 24 (Prior Art)
FIG. 25
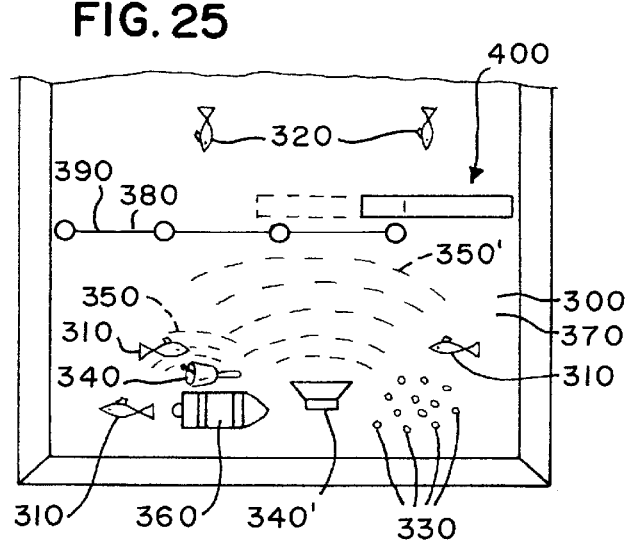
FIG. 26
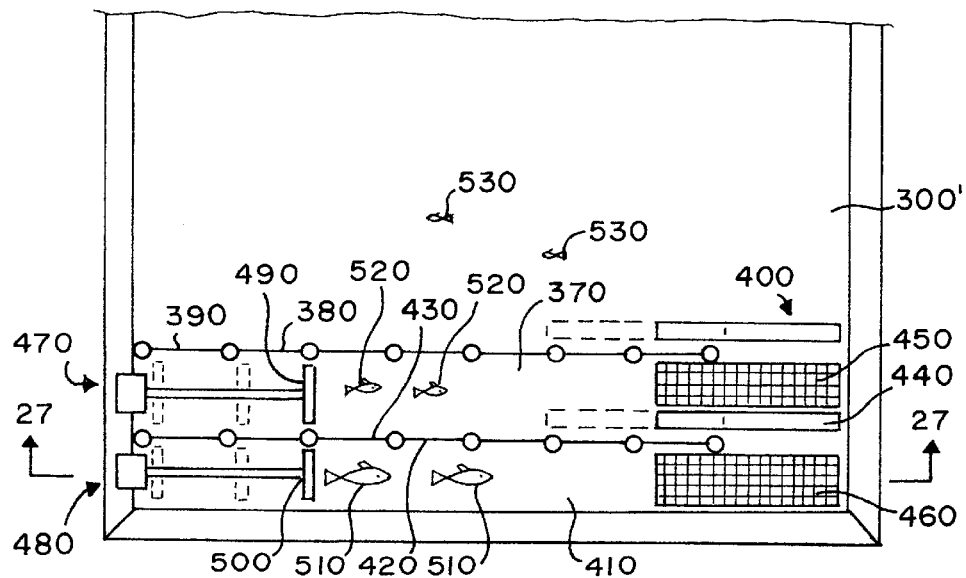

METHOD OF USING SOUND FOR ATTRACTING AND GRADING FISH

CROSS REFERENCE TO RELATED APPLICATIONS

This application is a continuation-in-part of the inventor's U.S. patent application Ser. No. 09/901,233 (filed Jul. 9, 2001) now U.S. Pat. No. 6,532,902, entitled "Duck Shooting Resort Layout and Duck Training Method Therefor."

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to fish farming, and in particular, to a method and apparatus for using sound for attracting and grading fish.

2. Information Disclosure Statement

It is often desired to provide a preserve within which hunters may shoot ducks, and it is also often desirable to fish in water provided in such a preserve. Prior art preserves are necessarily large and rather wasteful of land because groups of hunters must necessarily be separated by great distances so that they do not inadvertently shoot one another while shooting at the ducks. Furthermore, prior art duck hunting resorts rely on the unpredictable behavior of wild ducks, who only occasionally will venture into the hunting area when attracted by decoys and artificial duck calls. This unpredictability as to the presence of ducks can diminish the pleasure of hunting as hunters sit for hours without seeing a duck to shoot.

It is therefore desirable to have a duck hunting preserve that provides for higher density of hunters on a given area of land than heretofore possible. It is further desirable that such a duck hunting preserve provide a ready supply of ducks who remain in the preserve for shooting in a natural outdoor setting, without requiring any tethering or artificial restraint to retain the ducks within the preserve.

When raising fish in a commercial fish farming operation, it is desirable to have means for separating the fish into various "grades" according to the size of the fish. Heretofore, as shown in FIGS. 23 and 24, commercial fish farming operations would use a body of water 200 that had a sloped bottom 210 such that, when the fish 220 were to be harvested, the water would be drained from its usual full level 205 to a lower level 205' so as to cause the fish 220 to swim with the remaining water in the deeper end 230 and become densely packed in the deeper end 230. Once the fish were collected in the deeper end 230, a well-known scoop or net (not shown) would be used in a manner well-known to those skilled in the art to gather and lift the fish 220 from the body of water and into a grading tank 240 having a grading screen 250 of a certain mesh size that would permit smaller fish 220' to pass through the grading screen 250 while retaining the larger fish 220, which are too large to pass through the grading screen 250, within the grading tank 240. It is also well-known in the prior art to use a succession of grading screens 250, each with different-sized mesh, to separate out various sizes of fish for harvesting, with smaller fish passing through the mesh depending on the mesh size and the size and species of fish. This prior art approach is undesirable because it requires the body of water to be drained in order to harvest the fish.

A preliminary patentability search in Class 43, subclasses 1 and 4.5, Class 273, subclasses 444, 447, and 140, and Class 473, subclass 466, for the duck shooting resort layout and duck training method of the inventor's pending U.S. application Ser. No. 09/901,233 (filed Jul. 9, 2001), of which this application claims priority and is a continuation-in-part, produced the following patents, some of which may be relevant to the present invention: Van Der Mude, U.S. Pat. No. 5,560,615, issued Oct. 1, 1996; and Maiwurm, U.S. Pat. No. 1,409,227, issued Mar. 14, 1922.

During the prosecution of the inventor's pending U.S. application Ser. No. 09/901,233 (filed Jul. 9, 2001), of which this application claims priority and is a continuation-in-part, the Examiner cited two references, namely, Safwat, U.S. Pat. No. 6,347,908 (issued Feb. 19, 2002), and Hillier, U.S. Pat. No. 4,029,049 (issued Jun. 14, 1977). The Examiner also pointed out that natural landscapes and national park areas allow hunting, and that the prior art included ponds, lakes, parks, bridges connecting to land over bodies of water, and naturally-occurring embankments that encircle water, channels, and contours formed in the land.

It is known to train domestic animals and to train animals in zoos and entertainment parks. However, the present invention of training fish using sound and food to congregate in a certain location in a commercial fish farming setting is not believed to be known prior to the present invention by the inventor, as more fully disclosed herein.

None of these references, either singly or in combination, disclose or suggest the present invention.

BRIEF SUMMARY OF THE INVENTION

The present invention of the inventor's pending U.S. patent application Ser. No. 09/901,233 (filed Jul. 9, 2001) is a duck shooting resort layout having a body of water that is preferably an elongated channel, a peripheral embankment encircling and containing the body of water, a duck hunting region within the duck shooting resort layout and including at least a portion of the body of water, and preferably one or more duck hunting blinds within the duck hunting region from which duck hunters may shoot ducks. While prior art duck shooting resorts are well-known, a significant and non-obvious feature of the duck shooting resort layout of the present invention is the providing of trained ducks that have been taught to fly only within, and not outside, the duck hunting region. A variety of embodiments of the invention, with islands, piers, or embankment fingers in the body of water, are described that safely allow a high density of hunters to be accommodated within a given area of land. A method of training the ducks of the present invention to fly only within the duck hunting region has been experimentally tested and is described. A method of construction of the duck shooting resort layout is described that allows a terrain of land to be sculpted into the structure of the present invention at a minimum of cost and movement of dirt. A variation of the invention is provided in which the depth of the body of water increases substantially monotonically toward one or both ends of the body of water so that fish may be harvested by partially draining the body of water and forcing the fish to the deeper ends, and a second variation of the invention is provided with one or more fish grading screens being provided at the ends of the body of water to allow trapping and collection of different sizes of fish by the fish grading screens.

It is an object of the present invention to provide a duck hunting resort having trained ducks that have been taught to fly only within a certain duck hunting region. It is a further object of the present invention to provide a duck hunting resort that safely provides for a higher density of hunters within a given area of land than heretofore possible. It is a still further object of the present invention to provide multiple uses of the resort by allowing growing and harvesting of fish in the body of water within the resort.

An improvement of this duck shooting resort layout is also provided, namely, a method of using sound for attracting and grading fish in a commercial fish farming operation. A certain sound, such as a bell or other noise, is made during a training period, by which fish become trained to associate feeding with that sound, and learn to congregate in a certain location when that sound is made so that they can receive food and, if desired, medication. During harvesting, the sound is used to attract the fish into grading areas so that grading screens can be used to segregate fish of different sizes for harvesting.

It is an object of this improved method of using sound for attracting and grading fish to eliminate the need during harvesting for draining the body of water in which the fish grow. It is a further object of this improved method of training fish to provide the capability of collecting the fish into a confined area for controlled medication of the fish.

BRIEF DESCRIPTION OF THE SEVERAL VIEWS OF THE DRAWING

FIG. 2 is a transverse elevational view through an embankment finger of the present invention, taken substantially along the line 2—2 shown in FIG. 1.

FIG. 3 is an elevational view through embankment fingers of the present invention, taken substantially along the curved line 3—3 shown in FIG. 1.

FIG. 4 is a partial top plan view of a second embodiment of the duck shooting resort layout of the present invention.

FIG. 5 is a partial top plan view of a third embodiment of the duck shooting resort layout of the present invention.

FIG. 6 is a top plan view of a portion of a fourth embodiment of the duck shooting resort layout of the present invention.

FIG. 7 is a longitudinal elevational view through embankment fingers of a first variation of the present invention, taken substantially along the curved line 7—7 shown in FIG. 1.

FIG. 8 is a diagrammatic side view showing hunters in a blind atop an embankment finger of the present invention.

FIG. 9 is a diagrammatic plan view showing the daily progressive feeding method for training ducks of the present invention.

FIGS. 12–15 are partial top plan views of the duck shooting resort layout of the present invention, showing how to use a boat to force the ducks to fly into the wind.

FIG. 16 is a top plan view of one end of a second variation for all embodiments of the duck shooting resort layout of the present invention, showing sliding gates for entrapping fish in the water behind the fish grading screens.

FIGS. 17 and 18 are partial views of fish grading screens of the second variation of the present invention, showing differing mesh sizes of the fish grading screens.

FIG. 19 is a partial top plan view of a sixth embodiment of the duck shooting resort layout of the present invention.

FIG. 20 is an elevational view of a portion of the sixth embodiment of the duck shooting resort layout of the present invention, taken substantially along the line 20—20 shown in FIG. 19.

FIG. 21 is a partial top plan view of a seventh embodiment of the duck shooting resort layout of the present invention.

FIG. 22 is a partial top plan view of an eighth embodiment of the duck shooting resort layout of the present invention.

FIG. 23 is a side elevation view showing a prior art body of water having a sloped bottom and being drained in order to harvest fish therein.

FIG. 24 is a side view of a prior art fish grading tank having a grading screen for allowing smaller fish to escape, with a portion of the tank removed to show the fish therein.

FIG. 25 is a top plan view showing the fish training method of the present invention with a single fish grading pen.

FIG. 26 is a top plan view of a second embodiment of the fish training method of the present invention, in which a plurality of fish grading pens are shown.

DETAILED DESCRIPTION OF THE INVENTION

Figure 1:
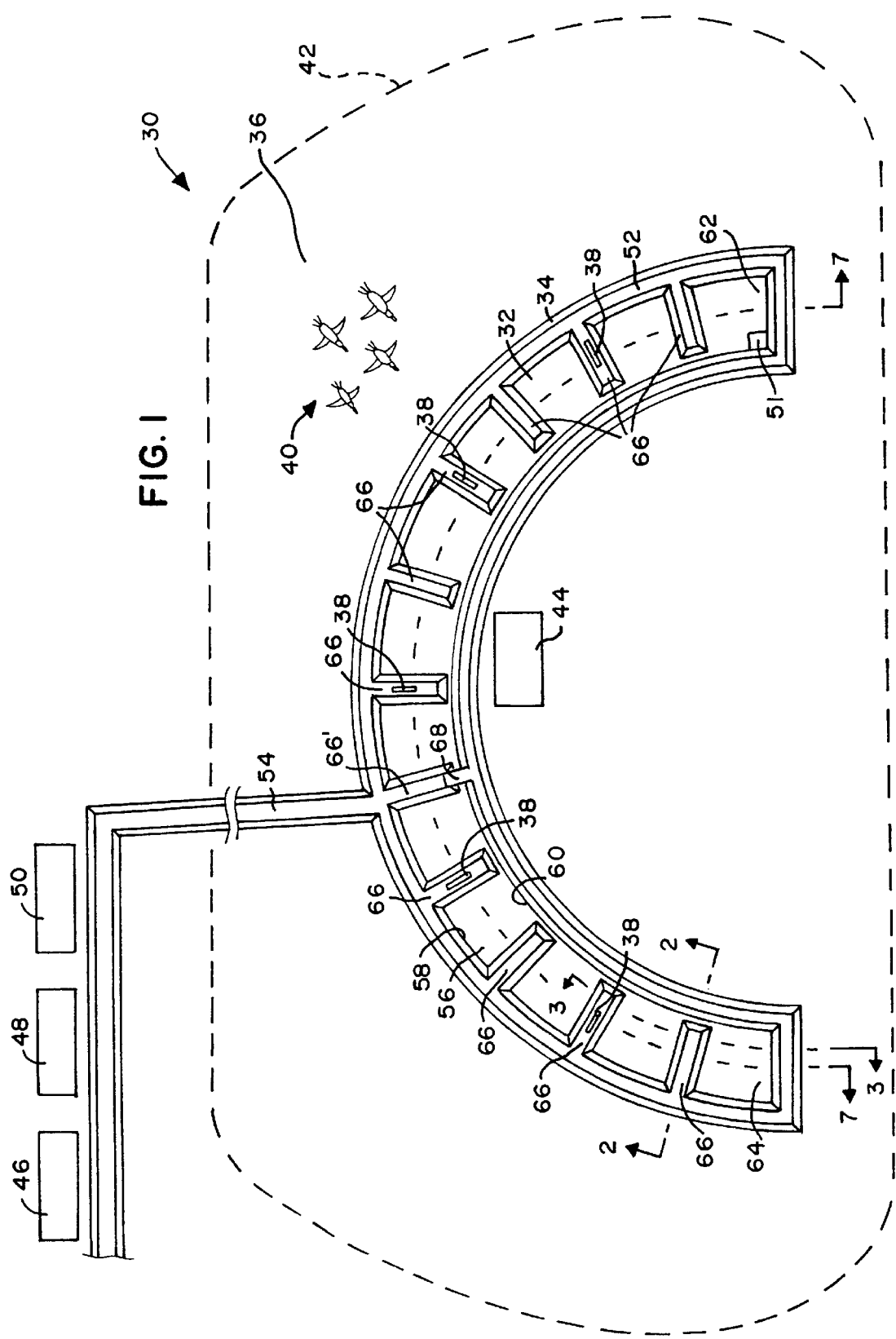
FIG. 1 is a top plan view of a first embodiment of the duck shooting resort layout of the present invention.

Referring to the drawing figures, a first embodiment 30 of the duck shooting resort layout of the present invention is shown in FIG. 1, and is seen to comprise a body of water 32, a peripheral embankment 34 encircling and containing the body of water 32, and a duck hunting region 36 within duck shooting resort layout 30 and including at least a portion, and preferably all, of body of water 32. Within the duck hunting region 36 is preferably provided, for comfort of hunters, at least one duck hunting blind 38 and preferably a plurality of such duck hunting blinds 38. An essential feature of all embodiments of the present invention is the inclusion within the duck shooting resort layout of a plurality of trained ducks 40 who have been taught to fly only within, and not outside, the duck hunting region 36, using a training method described hereinafter in great detail. Duck hunting region 36 may be selected to be any shape or size, but is bounded by a chosen hunting region perimeter 42 and is typically chosen to be an area such as about one-half to three-quarters of a mile (about 0.8 to 1.2 kilometers) in each direction from the body of water 32. It should be understood that the duck hunting region 36 need not necessarily extend the same distance in each direction from the body of water 32, and the training method of the present invention may be used to train ducks 40 to fly in almost any shape hunting region desired.

Preferably, all embodiments of the present invention will have one or more well-known dog kennels 44 for housing hunting dogs, and also may have outlying buildings 46, 48, 50 for offices, lodging, entertainment and relaxation, taxidermists, sale of hunting supplies, and consultation with hunting professionals, etc. A paved or gravel road 52 is preferably provided atop the peripheral embankment 34 for driving trucks and vehicles thereupon, with a connecting road 54 being provided to the buildings 46, 48, 50. Additionally, one or more duck trapping pens 51 may be provided at one or more locations along the body of water and accessible from the shore.

Peripheral embankment 34 preferably forms an elongated channel 56 holding body of water 32, with elongated channel 56 having first and second shores 58, 60 spaced apart from each other, and with elongated channel 56 further having first and second ends 62, 64 remote from each other.

The first embodiment 30 of the present invention includes at least one embankment finger 66, and preferably a plurality of embankment fingers 66, extending transversely across channel 56 from one of shores 58, 60, preferably with at least one, and preferably all, of the embankment fingers 66 having at least one of the duck hunting blinds 38 thereon for comfort and concealment of hunters. Preferably, one or perhaps more of the embankment fingers, such as embankment finger 66', includes a bridge 68 spanning therefrom to the other of the shores, thereby providing connectivity and passage over embankment finger 66' from one shore 58 to the other shore 60 and allowing vehicles to go quickly from one side of the channel to the other without having to take a circuitous route on road 52 around one of the ends 62, 64 of the elongated channel. It shall be understood that the reason that the embankment fingers 66, 66' do not extend fully from shore to shore is to allow ducks and fish within the body of water 32 to swim in the body of water from one end 62 to the other end 64, and to allow boats on the body of water to likewise traverse from one end 62 to the other end 64 by passing under bridge 68. Because of the unimpeded access provided to the entire channel, such boats can thus easily travel between various hunting blinds 38 and retrieve dead and crippled ducks that have been shot from the hunting blinds 38. The embankment fingers also provide additional shoreline for the body of water so as to allow greater fishing opportunities alongside the water.

Preferably, the embankment fingers 66 include trees and foliage cover 70 so as to protect one hunting blind 38 from being hit by shotgun shot from another hunting blind 38, and also to protect the embankment fingers 66 from wind and water erosion. The embankment fingers 66 with trees and foliage cover 70 also serve to protect the ducks from predators and the weather.

Referring especially to FIGS. 2 and 3, a preferred method of constructing the resort layout will now be described. Initially, before constructing the resort layout, the terrain surrounding and encompassing the area from which the peripheral embankment, embankment fingers, and elongated channel are formed has a first terrain surface contour represented schematically by surface contour line 72 showing the elevation of the first terrain surface contour, it being understood that the first terrain surface contour has a first averaged elevation. In the simple example case shown in FIGS. 2 and 3, in which the first terrain surface contour is assumed to be horizontal, the first terrain surface contour and the first averaged elevation are understood to both be represented by the same contour line 72, but in the usual case where the first terrain surface contour is not perfectly horizontal, as, for example, shown by partial contour line 72', the variations in elevation of the first terrain surface contour may be averaged, in a manner well known to those skilled in the art, to a first averaged elevation 72. After formation of the peripheral embankments, the formed terrain has a second terrain surface contour 73 up and down along the upper surface of peripheral embankment 34 and its downward sloping shore 74, then along the bottom 76 of the channel 56, then up and down the surface of embankment finger 66, then again along the bottom 76 of the channel 56, then again up and down the surface of the next embankment finger, etc., it being understood that the peripheral embankment, embankment fingers, and channel are formed by moving earth from one place to another, sculpting the first terrain surface contour into the desired second surface contour. Simply for clarity in explanation, the moved earth 78 is shown with one shading in FIGS. 2 and 3, and the unmoved earth 80 is shown with a different shading in FIGS. 2 and 3. It will be understood, however, that because earth is simply moved from one place to another to sculpt the hunting resort layout from the original terrain contour, the first averaged elevation 72 will be substantially equal to the second averaged elevation, and both will thus be represented by the same averaged contour line 72. Civil engineering computer programs are well known that can compute the required movement of earth to sculpt a given first terrain surface contour into the desired second terrain surface contour of the present invention.

For example, when channel 56 is constructed in a semi-circular fashion as shown in FIG. 1, a typical diameter for the semi-circle may be 2700 feet (823 meters). Assuming a flat (horizontal) first surface contour for the terrain, one solution for the second surface contour, in which the downward slope for the sides of the embankment fingers 66 and the peripheral embankment 34 is chosen to be a gentle ratio of 1:5 (i.e., a vertical rise that is ⅕ the horizontal run), would yield a typical length 82 for an embankment finger 66 of about 205 feet (62 meters), a distance 84 from one embankment finger 66 to another of about 300 feet (91 meters), with the top of an embankment finger 66 being a height 86 of about 1.5 feet (0.46 meters) above the surface of the water 32. Such a solution would produce a width 88 of embankment fingers 66, as measured at the channel bottom 76, of about 90 feet (27 meters), and would produce a longitudinal distance 90 between the peripheral embankment 34 and the last embankment finger 66 on each end of channel 56, as well as between adjacent embankment fingers 66, as measured along the channel bottom 76, of about 255 feet (78 meters), and a transverse distance 92 between each embankment finger 66 and the peripheral embankment 34 on the opposite shore, as measured along the channel bottom 76, of about 15 feet (4.6 meters). Such a solution produces a channel bottom 76 that is a distance 94 below the first and second averaged elevations 72 of about 2.45 feet (0.75 meters), and distance 96 of the top of peripheral embankment 34 and embankment fingers 66 above the first and second averaged elevations 72 of about 3.55 feet (1.08 meters), yielding, by simple arithmetic, a distance of about 6 feet (1.8 meters) from the top of peripheral embankment 34 and embankment fingers 66 to the channel bottom 76 and a water depth of about 4.5 feet (1.4 meters). With such slopes and distances, the transverse width 98 of each embankment finger 66 will be about 30 feet (9.1 meters). Of course, other solutions for variations of the structure of the present invention are readily obtained using well-known civil engineering computer programs, simply by varying the channel width, embankment finger length, channel depth, etc.

Referring to FIG. 8, a typical hunting blind 38 is shown having a typical transverse width 100 of about 8 feet (2.4 meters) so as to comfortably accommodate a duck hunter 102. Preferably the blind 38 may have a longitudinal length of about 28 feet (8.5 meters) so as to comfortably accommodate up to ten hunters 102 side-by-side with their hunting equipment. The blind 38 preferably has a tarpaulin cover 104 mounted upon a well-known frame 106, with cover 104 having first and second sides 108, 110 that may be rolled up as shown to allow shooting out of the blind or that may be draped down in an unrolled state 108', 110' so as to prevent shooting out of the blind on one side or to block wind or rain from entering the blind 38. Under instruction from a guide at the hunting resort, and for safety, the hunters 102 will be instructed to either unroll one side or the other of the tarpaulin cover 104 so that hunters in blinds 38 on adjacent embankment fingers will not be shooting at one another. In other words, under instruction from the guide, the hunters 102 will shoot out one side of the blind or, again under instruction from the guide, the hunters may shoot out the alternate side of the blind as shown by the alternate shooting position of hunter 102'. Preferably, the ground cover around the blinds 38 may include bushes 112 to further conceal the blinds 38 from ducks.

Referring to FIG. 7, a first variation 30' of all embodiments of the present invention is shown in which the body of water 32 is stocked with a plurality of fish 114, and further in which the channel bottom 76', rather than being horizontally flat, is sloped toward one or both ends to allow harvesting of the fish 114 in a manner that will now be described.

In this first variation 30', the elongated channel 56' still has first and second ends 62, 64 as before, and the elongated channel has a first depth 116 adjacent first end 62 and has a second depth 118 intermediate first and second ends 62, 64, with first depth 116 being greater than second depth 118, and in which the elongated channel 56' has a depth that decreases substantially monotonically from the first depth 116 to the second depth 118. It shall be understood that the channel 56' may either have a symmetrical sloping bottom that increases in depth from the middle of the channel 56' as shown toward both ends 62, 64, or else a minimum second depth 118 may be adjacent second end 64 and the channel bottom will slope monotonically from second end 64 to first end 62. When harvesting of fish 114 is desired, channel 56' is drained to a reduced level of water 120 so as to drive fish 114 to the deeper end 62 and away from the shallower portions of channel 56', and the fish can then be easily harvested from the partially-drained channel 56'.

Referring to FIGS. 16–18, a second variation 30' of all embodiments is shown in which the body of water 32 is also stocked with fish 114, 114', but which allows harvesting of the fish without having to drain the channel. In this second variation, elongated channel 56 has a first meshed fish grading screen 122 extending transversely across the elongated channel 56 adjacent first end 62 so as to separate elongated channel 56 into a first portion 124 at first end 62 and into a second portion 126 remote from first end 62. As shown in FIG. 17, first meshed fish grading screen 122 has a certain first mesh opening size chosen so that fish larger than the first mesh opening size cannot pass through first meshed fish grading screen 122 and will be entrapped thereby, and so that fish smaller than the first mesh opening size may pass through the first meshed fish grading screen. First meshed fish grading screen 122 further includes well-known selectably openable first gate means 128 for selectably creating a first unmeshed opening 130 within first meshed fish grading screen 122 so that all fish may pass therethrough. Gate means 128 preferably is slidably openable and closeable as shown, by any well-known mechanical or manual means, moving from a closed position 132 to an opened position 134.

Likewise, in this second variation of the present invention, elongated channel 56 further preferably has a second meshed fish grading screen 136 extending transversely across the elongated channel 56 and interposed between first meshed fish grading screen 122 and first end 62 so as to separate first portion 124 of channel 56 into a first subportion 138 at first end 62 and into a second subportion 140 adjacent first meshed fish grading screen 122. As shown in FIG. 18, second meshed fish grading screen 136 has a certain second mesh opening size, larger than the first mesh opening size of first meshed fish grading screen 122, with the second mesh opening size being chosen so that fish larger than the second mesh opening size cannot pass through second meshed fish grading screen 136 and will be entrapped thereby, and so that fish smaller than the second mesh opening size may pass through the second meshed fish grading screen 136. Like first meshed fish grading screen 122, second meshed fish grading screen 136 further includes similar well-known selectably openable second gate means 142 for selectably creating a second unmeshed opening 144 within second meshed fish grading screen 136 so that all fish may pass therethrough. Gate means 142 preferably is slidably openable and closeable as shown, by any well-known mechanical or manual means, moving from a closed position 146 to an opened position 148.

To harvest fish using this second variation of the present invention, first and second gate means 128, 142 are both opened to their respective opened positions 134, 148. Fish food is then placed adjacent end 62 of channel 56. Fish, attracted by the fish food, will gather at end 62 of channel 56. Gates 128, 142 are then both closed to their respective closed positions 132, 146. The larger fish 114 will be trapped within first subportion 138, and smaller fish 114' will pass through second fish grading screen 136 and will be trapped within second subportion 140. Still smaller fish, too small to harvest, will pass through first fish grading screen 122 and out into the second portion 126 of the channel 56, where they may be harvested at a later date after they have grown larger.

It shall be understood that the capacity of the duck hunting resort can be easily expanded, when desired, simply by extending the channel at one or both ends and by providing additional embankment fingers across the extended elongated channel.

Second, third, fourth, fifth, sixth, seventh, and eighth alternate embodiments of the present invention are shown in FIGS. 4–6, 10–11, and 19–22. Identifying reference designators for the second, third, fourth, fifth, sixth, seventh, and eighth embodiments are marked similarly to the first embodiment, except with the respective prefixes "2.", "3.", "4.", "5.", "6.", "7.", and "8.". It shall be understood that many aspects of all embodiments are substantially the same, and only the differences will be treated in detail, it being understood that similar structural features of the various embodiments perform similar functions. The significant difference between all embodiments is the shape of the elongated channel and the variations of the structures that, in the first embodiment, are the embankment fingers 66, 66'.

A second embodiment 2.30 of the present invention is shown in FIG. 4. The significant difference between first embodiment 30 and second embodiment 2.30 is that, in second embodiment 2.30, the elongated channel 2.56 is "L-shaped" rather than being semi-circular as in the first embodiment 30.

A third embodiment 3.30 of the present invention is shown in FIG. 5. The significant difference of the third embodiment 3.30 is that the elongated channel 3.56 is "C-shaped" rather than being semi-circular or "L-shaped".

Figure 10:
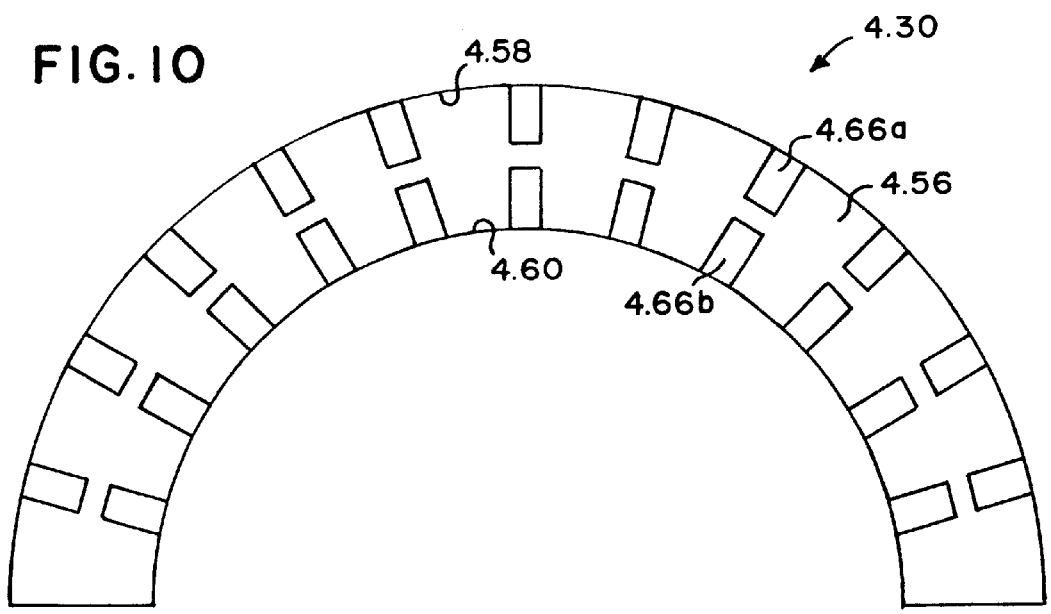
FIG. 10 is a partial top plan view of the fourth embodiment of the duck shooting resort layout of the present invention, a portion of which is shown enlarged in FIG. 6.

A fourth embodiment 4.30 of the present invention is shown in FIGS. 6 and 10. The significant difference of the fourth embodiment 4.30 from the first embodiment 30 is that, in fourth embodiment 4.30, embankment half-fingers 4.66a, 4.66b extend transversely across channel 4.56 from opposite shores 4.58, 4.60, with a gap being between the opposing embankment half-fingers 4.66a, 4.66b rather than between each embankment finger 66 and the opposite shore's peripheral embankment 34.

Figure 11:
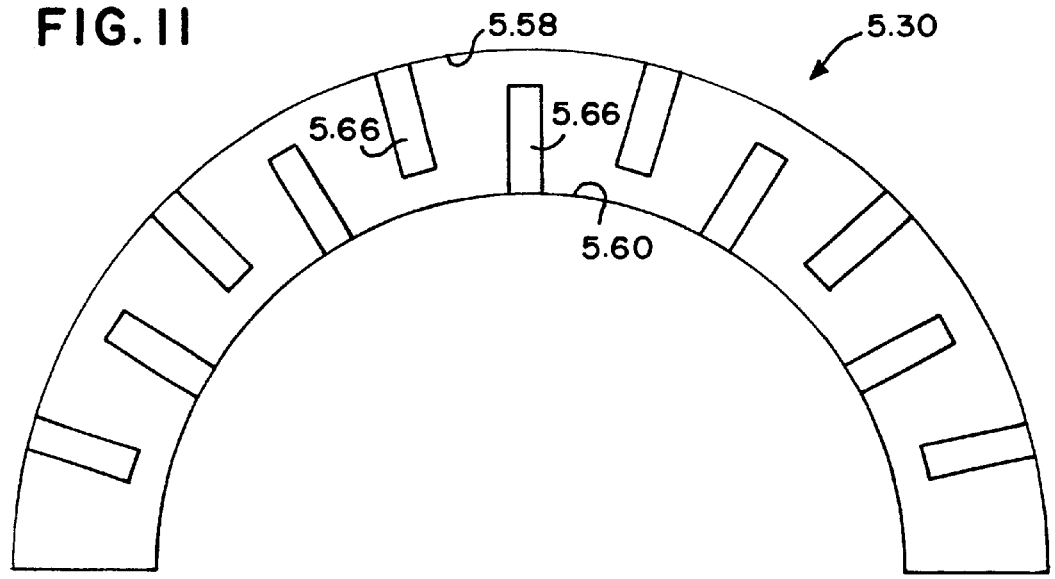
FIG. 11 is a partial top plan view of a fifth embodiment of the duck shooting resort layout of the present invention.

A fifth embodiment 5.30 of the present invention is shown in FIG. 11. The significant difference between the fifth embodiment 5.30 and the first embodiment 30 is that, in the fifth embodiment 5.30, the embankment fingers 5.66 respectively extend alternately from first and second shores 5.58, 5.60.

A sixth embodiment 6.30 of the present invention is shown in FIGS. 19 and 20. The significant difference between the sixth embodiment 6.30 and the first embodiment 30 is that, in the sixth embodiment, wooden or concrete piers 6.66, supported by a plurality of wooden or concrete pillars or posts 150 are substituted for embankment fingers 66, with duck hunting blinds 6.38 preferably being located on and supported by piers 6.66.

A seventh embodiment 7.30 of the present invention is shown in FIG. 21. The significant difference between the seventh embodiment 7.30 and the first embodiment 30 is that, in the seventh embodiment 7.30, islands 7.66, 7.66' are substituted for the embankment fingers 66 of the first embodiment. Some or all of the islands 7.66' may have one or more bridges 7.68 extending from the islands to the peripheral embankment so that the islands may be accessed without using a boat.

An eighth embodiment 8.30 of the present invention is shown in FIG. 22. The significant difference between the eighth embodiment 8.30 and the other embodiments is that, in the eighth embodiment, the channel 8.56 is serpentine with alternate embankment fingers 8.66 extending from opposite shores 8.58, 8.60.

It shall be understood that other aspects of all embodiments are similar, and all embodiments may have the variation of the fish grading screens and sloped bottoms, etc., and the embankment fingers, islands, piers, and various configurations of the different embodiments may be readily combined, if desired, in a manner that will now be apparent, to provide a variety of enjoyable hunting configurations in a single resort layout.

It should be emphasized that, in all embodiments of the present invention, the trained ducks 40 stay within the hunting region 36 only because of their training, described hereinafter, and not because of cages or tethers or the like.

Referring to FIG. 9, the present invention's preferred method of training the ducks can now be described. It is well-known that ducks cannot fly until they are about seven weeks old. Accordingly, once the duck shooting resort layout of the present invention has been provided, the young ducks are released into the resort when the ducks are less than twelve weeks old, and preferably when they are about four weeks old so as to provide about three weeks of preliminary training before the ducks begin to fly. During this preliminary training period, the ducks are only able to swim or waddle on the land, and during the first week following release, the ducks are fed each day at the same point at which they were released, each time accompanying the feeding with a certain loud noise so that the ducks come to associate the loud noise with the feeding.

The ducks are then fed on successive days within the duck hunting region while continuing to accompany the feeding with the certain loud noise so that the ducks continue to associate the loud noise with the feeding. Following this initial first week, the feeding point is then moved, from day to day, over an expanding area, until the ducks have become accustomed and trained to being fed over the entire duck hunting region. While the particular certain loud noise chosen is somewhat arbitrary, it is important that it be substantially the same noise from day to day so that the ducks become accustomed to the noise and come to associate the noise with feeding time. It is also important not to choose a noise such as the horn of a truck or vehicle, because the ducks might then become attracted to the sound of vehicles in a parking lot adjacent the buildings 46, 48, 50 shown in FIG. 1, and would quickly become disappointed when vehicle horns were not always accompanied by food. A particularly good choice of the loud noise has been experimentally found to be a well-known coach's whistle as is often used in sporting events.

Using the position of ducks 40a as an example starting point for the second week of training, a vehicle 158a is loaded with duck feed and driven to the ducks 40a, the certain loud noise is made, alerting the ducks that feeding time is near, and the vehicle will then be driven along a path 160. The ducks will follow the vehicle, expecting food, and should be taken as far as they will follow the vehicle. Once the ducks stop following the vehicle, the driver should back the vehicle up to the ducks and feed them.

On the next day, using the position of ducks 40b as an example starting point, vehicle 158b is loaded with duck food, the certain loud noise is made, and the ducks will then follow the vehicle 158b along a different path 162. It should be understood that preferably the same vehicle is used on every day of training, and the ducks will come to associate both the vehicle and the certain loud noise with feeding, and will approach that vehicle expecting food every time the certain loud noise is heard by the ducks. Likewise, on the third, fourth, and fifth days, example ducks 40c, 40d, and 40e respectively follow the vehicle 158c, 158d, and 158e along respective paths 164, 166, 168 as the ducks become trained to be fed at different locations within the duck hunting region. The feed should be scattered when issued so that all ducks may feed at about the same time. As time progresses, the vehicle can move the feeding locations to positions farther and farther from the body of water, until, as the ducks grow older and begin to fly, the ducks will fly over the entire hunting area and not beyond. This pattern of feeding in various locations should be continued so that the ducks remain accustomed to being fed over the entire duck hunting area.

A well-bred mallard duck will begin flying a few feet at about seven weeks of age, and this is the age at which the ducks should be introduced to motor boats. Using a motor boat, a duck herder should then begin driving or herding the ducks into the wind so that they begin to take off into the wind. Referring to FIGS. 12–15, a boat 170 with a duck herder in it is preferably provided to cause the ducks 40 to fly, in a manner shown in FIGS. 12–15 for four variations 172a, 172b, 172c, 172d, of wind directions. In all cases, the ducks 40 are urged to fly into the wind by using the boat 170 to come up behind the ducks 40, as shown by the dotted outline path taken by the boat 170, and drive the ducks 40 into flight into the wind. The duck herder may need to vary the speeds of the boat's motor in order to scare the ducks into flight, or may need to wave a boat paddle at the ducks, or to throw decoy dummies at the ducks so as to provoke the ducks into flight. About ten to fifteen minutes of exercise a day should be sufficient. Once the ducks become about twelve weeks old, the training regimen of this daily exercise and feeding at different locations accompanied by the certain loud noise will cause the ducks to be flying the entire gamut of the duck hunting area in accordance with their training. At about twelve to fourteen weeks of age, the mallard drake will begin getting his bright coloring.

The training schedule for the ducks should be arranged so that the ducks become fully trained shortly before the duck hunting season begins. Once the ducks become fully trained and the hunting season has begun, the ducks still need to be fed each day but the certain loud noise no longer needs to accompany the feeding.

Once the duck hunting resort layout has been constructed and the ducks have been trained in accordance with the method of the present invention, and when the duck hunting season is open, preparation is generally required in order to provide maximum hunting enjoyment to the hunters. About thirty minutes before the hunters arrive at the blinds for hunting, duck herders should board two small boats and drive the ducks to a chosen one of ends 62, 64 of the channel 56 (but not to both ends). The ducks will swim or fly to the chosen end of the channel 56 by the coaxing of the duck herders. Resort guides will then open the one of the sides 108, 110 of the blinds 38 that is facing the chosen end of the channel 56 into which the ducks have been herded. To maximize the thrill and fairness of hunting, care should be taken not to let the hunters view the herding of the ducks to the chosen end of the channel. Once the ducks have been herded into the chosen end of the channel, the hunters 102 are then driven to the various blinds 38 or hunting locations along road 52 and are instructed to enter the blinds 38 and prepare for the hunt.

Preferably there will be one guide and one dog in each blind that has hunters in it. Additionally, for about every two or three blinds 38, preferably there will be a boat on the body of water with one duck herder and a dog in it to control the ducks and pick up crippled and dead ducks for the blinds 38 assigned to that boat.

During the hunt, the ducks 40 may need to be controlled to provide a more pleasurable hunting experience to the hunters. About ninety percent of the time, once trained, the ducks will get up and fly over the duck hunting region on their own. Most of the time, as the ducks tire of flying, they will return to the water where they float and rest, but otherwise will fly within the duck hunting region for which they have been trained. The ducks will prefer to light in the water where other ducks can be seen and where they hear the contented calls of other ducks. Accordingly, hunters will place decoys in the channel 56 proximate their blind 38 and then make simulated duck noises using well-known duck call devices so as to attract the tiring ducks to the decoys for shooting by the hunters. Ducks are athletes, and prefer to fly the first two or three hours in the morning and the last two or three hours in the afternoon. Accordingly, if both morning and afternoon hunting sessions are to be provided, the ducks must be allowed to rest between about 10:00 a.m. until about 2:00 p.m., and the ducks must be fed during this mid-day rest period.

Occasionally, the ducks must be encouraged to fly. As in training, one boat 170 with a duck herder in it is preferably provided to cause the ducks 40 to fly when needed, in a manner shown in FIGS. 12–15 for four variations 172a, 172b, 172c, 172d, of wind directions. In all cases, the ducks 40 are urged to fly into the wind by using the boat 170 to come up behind the ducks 40, as shown by the dotted outline path taken by the boat 170, and drive the ducks 40 into flight into the wind. The ducks 40, being trained, will then fly within the pre-taught hunting region and provide the hunters with a pleasurable hunting experience.

Preferably, the duck hunting safety rules as shown in Table 1 shall be posted in the blinds and on the grounds of the resort, and shall be enforced to ensure safety of the hunters and a pleasurable hunting experience:

TABLE 1

Duck Hunting Safety Rules

1. Shooting allowed from blinds only.
2. Obey the guide at all times.
3. No shooting when sitting down.
4. When sitting down, unload your gun.
5. Do not load guns before entering blinds.
6. Unload guns before leaving blinds.
7. No shooting ducks on water without permission.
8. Watch for boats, guides, and dogs.
9. Pick up spent shells before leaving blinds.

Turning now to FIGS. 25–29, the present invention of using sound for attracting and grading fish in a commercial fish farming operation will now be described. It shall be understood that the present invention's method of using sound for attracting and grading fish in a commercial fish farming operation may be used in combination with, or apart from, the duck shooting resort as described hereinabove. If used in combination with the duck shooting resort, the body of water serves multiple uses, namely, for the ducks and for the fish, and this multiple use of the body of water can make the duck shooting resort more commercially attractive to an owner or operator of the resort. However, because one of the advantages of the method of using sound for attracting and grading fish in a commercial fish farming operation is the elimination of the need to drain the body of water to harvest the fish, there are significant economies to be realized by employing the present invention's method of using sound for attracting and grading fish in a commercial fish farming operation even when the body of water is not also used for a duck shooting resort. The improvement of using sound to attract and grade fish is an enhancement of the use of grading pens described hereinabove, in that a certain sound accompanies the providing of fish food to the fish so that the fish become accustomed to being fed when hearing the certain sound, and, upon hearing the sound, the fish learn to congregate in proximity of the source to receive food. Once congregated, the fish can be medicated and/or harvested, in a manner that will now be described in detail.

As with the duck training method described hereinbefore, the fish training method of the present invention trains a plurality of fish to congregate at a source of a certain sound by providing a body of water, such as body of water 300, with a plurality of fish 310, 320 therein, then providing fish food 330 in proximity with a source, such as source 340 or 340', of a certain sound so that the fish come to associate the source, 340 or 340', with the providing of fish food 330 and learn to congregate at the source whenever the certain sound is heard or felt by the fish. It shall be understood herein that the term "sound" is used in the broad sense of vibrations that move through the water, and those vibrations may in the human-audible frequency range or may be in the sub-audible or above-audible frequency range. It shall be understood that it is the vibrations traveling through the water that are "heard" or equivalently "felt" by the fish, and these vibrations, emitted from the source 340 or 340' and traveling through the water, are what the fish become trained to associate with the providing of fish food 330. Accordingly, the source could be, for example, a bell 340, or a loudspeaker 340' driven by a well-known audio amplifier (not shown) and playing a chosen prerecorded sound or a sound amplified from a microphone (not shown) in a manner well-known to those skilled in the art. The sound equivalently could be a whistle, the engine noise made by a particular vehicle such as a boat, a truck, etc. The sound could also be the clapping of hands, or loud yells, or the blowing of a horn, or the striking of the gunwale of a boat with an object. Equivalently, the sound could be any vibration source for generating sound or vibration waves 350, 350' that travel through the water from source 340, 340' to the fish 310, 320. Whatever certain sound is chosen, that sound is repeated with the providing of fish food 330 in proximity therewith, on successive days, until the fish become trained to associate that certain sound with the providing of food.

Source 340, 340' could be permanently mounted at a fixed location within the body of water 300, or preferably could be moved, together with the providing of fish food 330 in proximity therewith, from location to location within the body of water 300 so that the fish come to congregate at the source 340, 340' of sound, wherever it happens to be located within the body of water 300, rather than at a single location. The inventor, by experimentation, has found that fish can be trained to congregate at the source 340, 340' of sound if the sound is accompanied by the providing of fish food 330 in proximity therewith, and will congregate at the sound wherever it is placed in the body of water. The advantage of having the fish congregate wherever the sound source is placed allows the fish to be drawn into fish grading pens, as hereinafter described, or to be drawn to a location where medication can be given to the fish so as to keep them healthy and to promote growth of the fish. The fact that fish can be trained to congregate at a sound source permits multiple grading pens to be located as desired within the body of water 300, and the fish can be drawn into a particular grading pen simply by locating the sound source within the particular grading pen. If desired, the source may be mounted upon a boat 360 that can travel about the body of water 300. As the fish become older and better trained, and as they become accustomed to associating the sound source with feeding, the fish tend to congregate faster at the sound source once it begins to emit the chosen sound. It should be noted that fish tend to be more lethargic during cold months and do not need to eat as much when it is very cold, so the training of the fish will be most effective during the warmer months when the fish have bigger appetites.

Referring to FIG. 5, a first fish grading pen 370 is provided having a first meshed fish grading screen 380 at a boundary 390 of the grading pen 370, with the grading screen 380 having a certain first mesh opening size. It shall be understood that fish grading screen 380 is substantially similar to fish grading screens 122, 136 heretofore described in conjunction with FIGS. 16–18, with a selected mesh size chosen for the size of fish to be entrapped within grading pen 370, and likewise that first gate means 400 of fish grading pen 370 is substantially similar to gate means 128, 142 heretofore described in detail. Because the structure of these elements has been already described, it is not repeated here.

Once the fish have been trained to associate the sound source with the providing of fish food, the fish can now be lured into fish grading pen 370 for medication or harvesting simply by placing sound source 340 or 340' within grading pen 370, opening gate means 400 so that the fish can enter into grading pen 370, and then closing gate means 400 after the fish have congregated at the source 340 or 340'. If the mesh size of screen 380 and gate means 400 is very small, then no fish will escape after gate means 400 is closed, and the fish can be retained within grading pen 370, using grading pen 370 as a holding pen, while medication is given to the fish to improve their health or to improve their growth. If the mesh size of screen 380 is chosen to be a certain size to entrappingly retain fish above a certain desired size while allowing smaller fish to pass therethrough, then, after a sufficient time has passed, the smaller fish will escape from grading pen 370 through screen 380, leaving only the larger fish for harvesting, as can now be understood.

Figure 27:
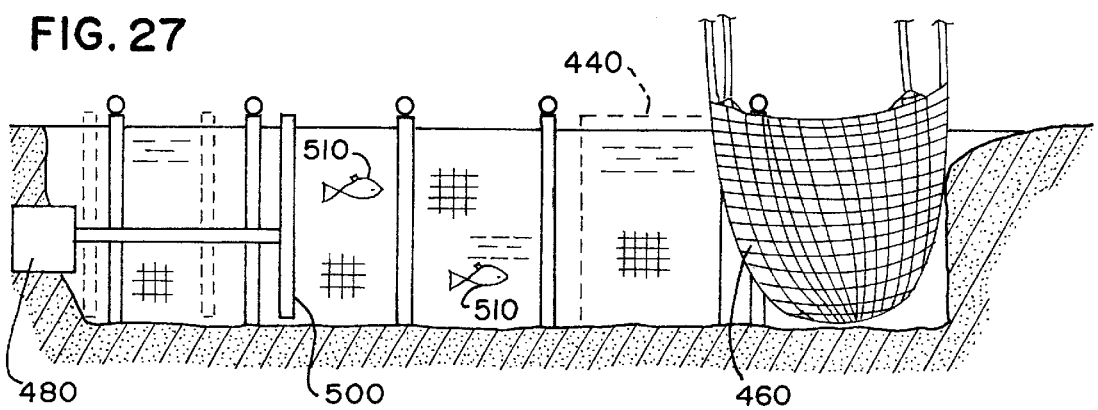
FIG. 27 is a side elevation view of a fish grading pen used in the fish training method of the present invention, showing the use of a net to remove the fish from the pen, taken substantially along the line 27—27 shown in FIG. 26.

FIG. 26 shows a second embodiment of the fish training method. For clarity, the sound source is omitted because its structure and use has already been described in detail. This second embodiment is similar to the first embodiment of the fish training method shown in FIG. 25 except that first and second fish grading pens 370, 410 are shown, respectively with first and second meshed fish grading screens 380, 420 at respective pen boundaries 390, 430, and respectively with first and second gate means 400, 440. The use of a plurality of grading pens has already been described hereinbefore, and need not be repeated. As before, grading screens 380 and 410 may have different mesh sizes so as to entrap different sizes of fish. Additionally, FIGS. 26 and 27 show that this second embodiment, like the first embodiment, may have pre-set (i.e., pre-located) nets 450 and 460 within each grading pen and placed at the bottom of the body of water, and each grading pen may also have compactor means 470, 480 with a well-known motorized or manual power source driving a ram 490, 500 that moves the fish within the grading pen to the grading pen region above the pre-set net 450, 460. Once the fish have been urged to the region above the grading pen's pre-set net, the net may be lifted as by a hoist as shown in FIG. 27 to extract the fish from the grading pen.

To use the grading pens of FIGS. 26 and 27, the fish are first trained, as hereinbefore described, to associate the sound source with the providing of fish food. Both gate means 400, 440 are opened, and the source is placed within grading pen 410, and the fish are lured into grading pen 410. Both gates 400, 440 are then closed. With the passage of time, smaller fish will escape through the larger grading screen mesh 420, leaving only the larger fish 510 within grading pen 410. If the mesh size of grading screen 380 is chosen to be smaller than the mesh size of grading screen 420, then, as time passes, the smallest fish 530 will escape from grading pens 370 and 410 back into the greater body of water, leaving the largest fish 510 in grading pen 410, intermediate-sized fish 520 in grading pen 370, and the smallest fish 530 back in the greater body of water. The respective nets can be used to harvest the fish that are retained in each grading pen. If the use of pre-set nets placed horizontally on the bed of the body of water is not desired, then a generally vertically-disposed net may be pulled from one end of each grading to the other to sweep the fish within the grading pen into the net for harvesting.

Figure 28:
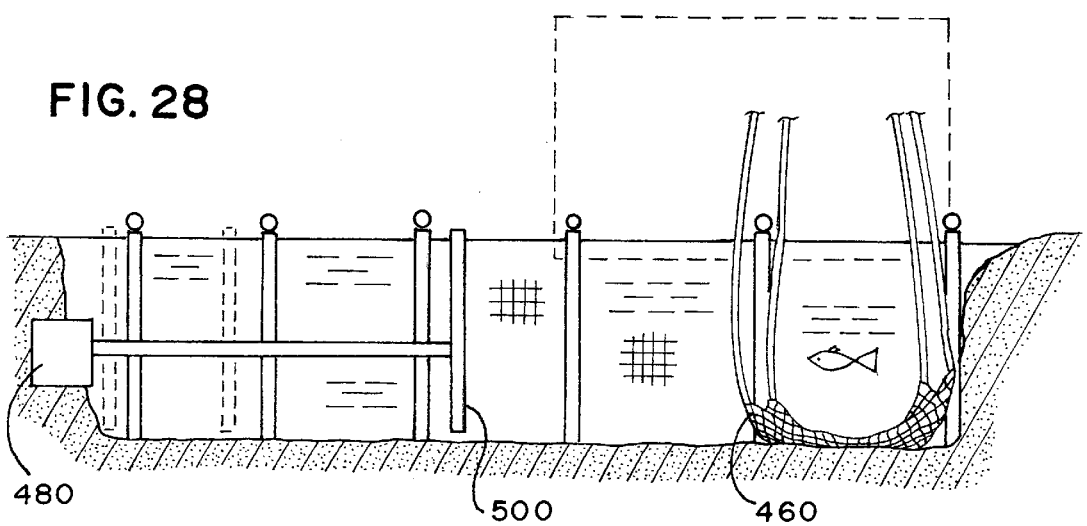
FIG. 28 is a side elevation view of another fish grading pen of the fish training method of the present invention, similar to FIG. 27 except having a gate that reciprocates vertically rather than reciprocating horizontally.

FIG. 28 is similar to FIG. 27, but simply shows that the gate mean may reciprocate vertically rather than horizontally, if desired. The other structural features of FIG. 28 are substantially as described for FIG. 27.

Figure 29:
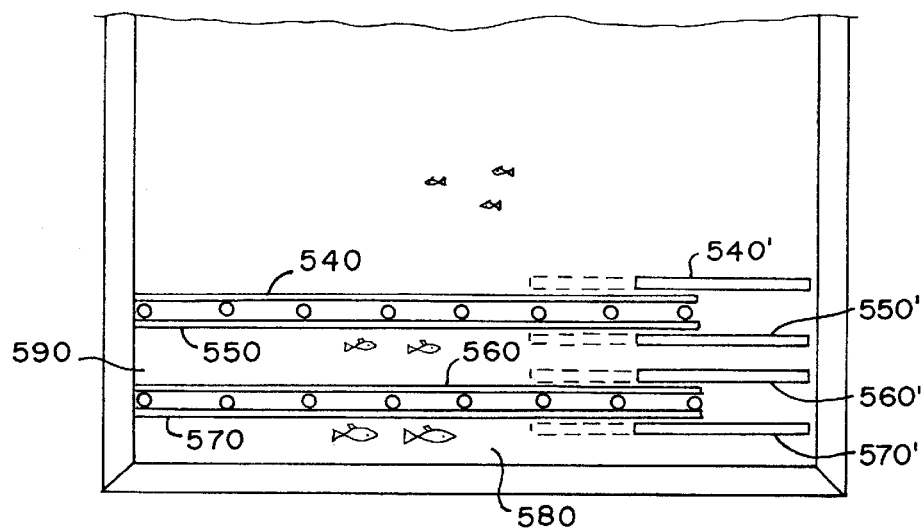
FIG. 29 is a top plan view of another embodiment of the fish training method of the present invention, similar to FIG. 26 except that a plurality of adjacent grading screens are provided at the perimeter of each grading pen.

FIG. 29 shows an alternate embodiment in which a plurality of screens are provided at each boundary of each grading pen, it being understood that each grading screen reciprocates vertically so as to selectively place the desired grading screens in the water. If the grading screens 540, 550, 560, and 570 are all of different sizes, then the sizes of fish trapped in the grading pens 580, 590 can be varied, as desired. Or, one of the grading screens at each boundary could be chosen with very small mesh size so that substantially no fish could pass therethrough, and such very small mesh size screens would serve as a fish barrier to retain fish within each grading pen. A plurality of gate means 540', 550', 560', and 570' is preferably also provided, each preferably having comparable mesh size to its respective grading screen 540, 550, 560, and 570. It should be understood that the embodiment shown in FIG. 29 may also include the compactor means, rams, and nets shown in FIGS. 26–28, and as hereinbefore described.

As an example, and for purposes of explanation of the use of the present invention, grading screen 550 and gate means 550' could have a screen mesh size for a 1.5 pound fish, grading screen 570 and gate means 570' could have a screen mesh size for a two pound fish, and grading screens 540 and 560, and gate means 540' and 560' could have a small mesh size so as to be fish barriers and allowing passage of no fish therethrough.

To use this example to harvest two pound and larger fish, all four gate means 540', 550', 560', and 570' would be opened; screens 540, 550, and 560 would be raised, and screen 570 would be lowered. The sound source would be placed within grading pen 580 to lure the fish into that grading pen with accompanying fish food and then gate means 570' would be closed. With the passage of time, as the fish become satiated fish smaller than two pounds would escape from grading pen 580, leaving fish of size two pounds and larger within grading pen 580, and these fish could be harvested using nets as hereinbefore described.

To use this same example to harvest both two pounds and 1.5 pounds fish on the same day, all four gate means 540', 550', 560', and 570' would be opened; screens 540 and 560 would be initially raised, and screens 550 and 570 would be lowered. The sound source would be placed within grading pen 580 to lure the fish into that grading pen with accompanying fish food. Gate means 550' and 570' would then be closed. With the passage of time, as the fish become satiated, fish smaller than two pounds will escape grading pen 580, and barrier screen 560 can be lowered and gate means 560' closed, trapping the two pound and larger fish in grading pen 580, from which they can be harvested as desired. With the further passage of time, fish smaller than 1.5 pounds will escape grading pen 590 back into the larger body of water, leaving fish between 1.5 pounds and two pounds in grading pen 590. Lowering barrier screen 540 and closing gate means 540' traps these fish within grading pen 590 for harvesting as desired.

Some of the advantages of the present invention's method training fish, as compared to prior art methods of commercial fish farming, are as follows The fish can be lured at any convenient time into the fish grading pens, which may be located at any convenient location on the body of water. In contrast to prior art commercial fish farming methods as shown in FIG. 23, the water level of the body of water does not have to be lowered in order to harvest the fish. Because the body of water does not have to be drained to harvest the fish, water is conserved, labor is conserved, and less time is spent handling the fish than in prior art methods of commercial fish farming. By utilizing various sizes of fish grading screens, the commercial fish farmer can harvest only a particular size of fish from the water rather than having to separate the fish after removal from the water and then return undersize fish to the body of water. Because only the fish of a desired size are harvested at a given time, and because the water is not drained from the body of water, there is less stress on the fish than with prior art methods of commercial fish farming, thereby improving the health and survival of the fish. Fish can be harvested daily if desired, rather than having only a single harvesting event as in typical prior art harvesting methods, allowing a given quota of fish to be harvested and/or allowing fish to be harvested as they reach a given size. Because the fish become trained to congregate to receive their food when they hear the certain sound, the fish can be safely medicated at lower expense than prior art methods allow because the medication can be concentrated and given only at the feeding location rather than being dispersed throughout the body of water. Because the fish are lured to the grading pens, a pre-set net can be used that is placed on the bottom of the grading pen and then lifted with the fish entrapped thereinside, rather than having to drag a net through a large body of water.

Additionally, the grading pens provide a holding area in which fish of a given size can be retained until harvesting occurs at a convenient time.

Although the present invention has been described and illustrated with respect to a preferred embodiment and a preferred use therefor, it is not to be so limited since modifications and changes can be made therein which are within the full intended scope of the invention.

I claim:

1. A method of grading a plurality of fish by size, said method comprising the steps of:

(a) providing a body of water with said plurality of fish therein;

(b) providing a first grading pen within said body of water, said first grading pen having a first meshed fish grading screen at a boundary of said first grading pen, said first meshed fish grading screen having a certain first mesh opening size, said first meshed fish grading screen including selectively-openable first gate means for creating a first unmeshed opening within said first meshed fish grading screen;

(c) training said plurality of fish to congregate at a source of a certain sound, said training comprising the step of providing fish food in proximity of said source on successive days while accompanying said providing of said fish food with said certain sound from said source so that said plurality of fish come to associate said source of said certain sound with said providing of said fish food;

d) opening said first gate means so that said plurality of fish may enter into said first grading pen;

(e) after said plurality of fish have been trained to associate said source with said providing of said fish food, locating said source within said first grading pen and then closing said first gate means after said plurality of fish have congregated at said source; then (f) allowing a portion of said plurality of fish to escape through said first meshed fish grading screen while said first gate means is closed.

2. The method as recited in claim 1, additionally comprising the step of providing medication for said plurality of fish in proximity of said source with at least one said providing of said fish food.

3. The method as recited in claim 1, which said source is a bell, and said certain sound is made by ringing said bell.

4. The method as recited in claim 3, additionally comprising the step of providing medication for said plurality of fish in proximity of said source with at least one said providing of said fish food.

5. The method as recited in claim 1, in which said source is a loudspeaker, and said certain sound is made by emitting said certain sound from said loudspeaker.

6. The method as recited in claim 5, additionally comprising the step of providing medication for said plurality of fish in proximity of said source with at least one said providing of said fish food.

7. The method as recited in claim 1, in which said training additionally comprises the step of moving said source on said successive days to different locations of said body of water.

* * * * *